April 8, 1930.  C. R. SHORT  1,753,808

SPRING SHACKLE

Filed April 9, 1926

Inventor
Charles R. Short

By Blackmore, Spencer & Flint
Attorneys

Patented Apr. 8, 1930

1,753,808

UNITED STATES PATENT OFFICE

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE

SPRING SHACKLE

Application filed April 9, 1926. Serial No. 100,892.

This invention relates to spring end connecting devices in which a block of resilient material is used in place of the pivotal connections now commonly employed. While the end connection disclosed in this application may be used in various relations it has been designed especially for automobiles to take care of the movement to which the rear end of the usual supporting spring is subjected. In such vehicles the ends of the springs are customarily pivoted to the vehicle frame. Such constructions are satisfactory at the front ends where the strains are largely radial but are not satisfactory at the rear ends where the movement is chiefly in elongation of the spring combined with a small amount of rocking with reference to the point of anchorage. My improved end connection is characterized by the fact that the end of the spring is cushioned against movement in all directions but particularly against lengthening movement. In its preferred form, the connection consists of a cushion of rubber or other resilient material having similar qualities fixedly secured to the end of the spring, usually through the intermediary of another member, and to the vehicle frame. This bushing is adapted to absorb both radial and axial thrusts and vibrations. The bushing may be secured to the parts with which it contacts by vulcanization or by means of interfitting projections on the bushing and the said parts, or, if desired, both vulcanization and projections may be employed.

Figure 1:
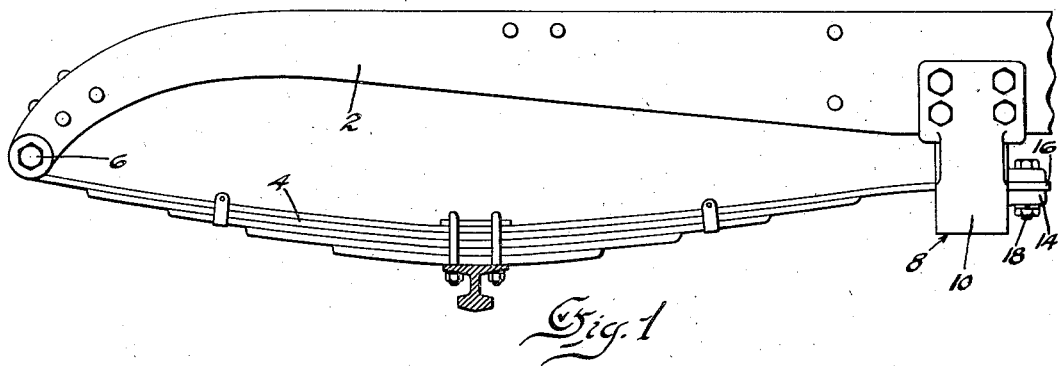
Figure 1 is a side elevation of a portion of an automobile frame showing the front spring assembly to which one of my improved spring end connections has been applied.
Figure 2:
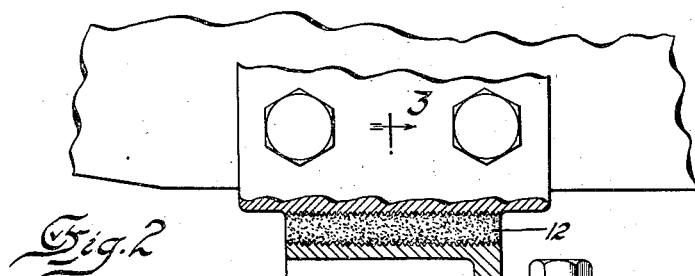
Figure 2 is a longitudinal section through my improved connection.
Figure 3:
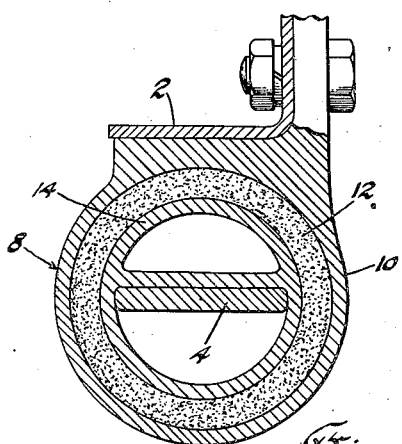
Figure 3 is a section on line 3—3 of Figure 2.

The reference character 2 indicates a portion of an automobile frame and 4 a leaf spring of conventional type which is pivoted to the front of the frame at 6. The reference character 8 indicates an improved end connection employed to connect the rear end of the spring to the vehicle frame. This connection consists of an annular bracket 10 bolted to the frame. Within the bracket is disposed bushing 12 of any suitable non-metallic cushioning material, such as rubber. Within the bushing is arranged a spring end connecting member 14 having a central slot therein through which the end 16 of spring 4 extends, the end of the spring being secured to the member 14 by bolt 18 passing through alined openings provided in the end of the spring and in the extension 20 of the member 14. I have illustrated the exterior surface of the member 14 and the interior surface of the bracket 10 provided with projections preferably in the form of annular threads for locking the bushing 12 to the bracket and member. If desired, the bushing may also be vulcanized to said parts and in some cases it may be sufficient to rely upon vulcanizing alone.

With the spring assembly illustrated very little trouble is experienced in holding the front end of the spring for the movement is principally radial. While there is also radial movement at the rear end of the spring the chief movement is in elongation of the spring and a small amount of rocking with reference to the point of anchorage. Both of these movements are permitted by my improved end connection, and at the same time the resilient material absorbs the shocks.

I claim:

1. In an automobile spring suspension, the combination of a frame, a leaf spring, an annular bracket secured to the frame having an opening of substantially uniform diameter throughout and extending in alignment with the longitudinal plane of the spring, a rubber bushing secured in the opening in said bracket, and a spring end connecting member secured in said bushing, in concentric relation with the bracket, and to which one end of said leaf spring is rigidly secured.

2. In an automobile spring suspension, the combination of a vehicle frame, an annular bracket secured to the frame, a rubber bushing secured in said bracket, a spring end connecting member secured in said bushing, and a leaf spring having one end extending within said bushing and secured to said spring end connecting member.

3. In an automobile spring suspension, the combination of a vehicle frame, a leaf spring having one end pivotally connected with the frame, a bracket secured to the frame and having an opening therethrough, and a bushing of non-metallic cushioning material arranged in the opening and through which the other end of the spring extends, whereby the spring is cushioned against movement in all directions.

4. The combination of a vehicle frame, an annular bracket secured to the frame and extending longitudinally thereof, a rubber bushing in said bracket, a cylindrical fitting secured in said bushing, and a leaf spring having one end extending through and rigidly secured to said fitting whereby deflection of the spring is accommodated by deformation of the bushing between the fitting and bracket.

5. In the combination as defined in claim 4, said bracket and fitting having the surfaces which engage with said bushing peripherally corrugated to resist separation thereof in an axial direction.

6. The combination with a vehicle spring and a frame, of a bracket secured to said frame having an opening of uniform diameter extending from end to end of the bracket and in direct alignment with the longitudinal plane of the spring, a spring end connecting member located within the opening, means to detachably and rigidly secure one end of the spring to said connecting member, and a body of non-metallic elastic material interposed between the bracket and spring end connecting member for deformation to accommodate axial movement thereof upon spring deflection.

In testimony whereof I affix my signature.

CHARLES R. SHORT.